Figure 1:
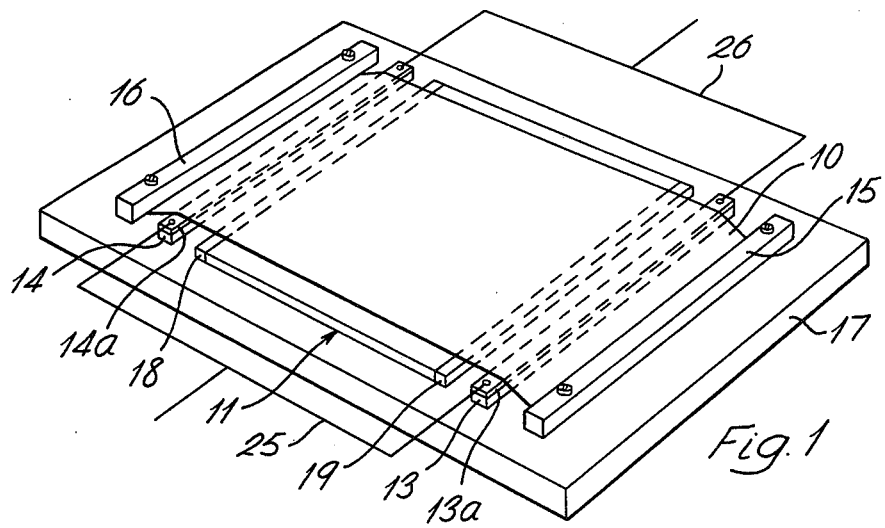

United States Patent [19]

Pobgee

[11] 4,149,029
[45] Apr. 10, 1979

[54] GRAPHICAL INPUT APPARATUS FOR ELECTRICAL EQUIPMENT

[75] Inventor: Peter J. Pobgee, Surbiton, England

[73] Assignee: National Research Development Corporation, London, England

[21] Appl. No.: 884,550

[22] Filed: Mar. 8, 1978

[30] Foreign Application Priority Data

Mar. 9, 1977 [GB] United Kingdom ............... 09946/77

[51] Int. Cl.² .......................................... G08C 21/00
[52] U.S. Cl. .................................................. 178/18
[58] Field of Search ............................ 178/18, 19, 20; 340/365 C, 347 AD; 338/90; 33/1 M; 200/46; 323/63

[56] References Cited

U.S. PATENT DOCUMENTS

| | | | |
|---|---|---|---|
| 2,907,824 | 10/1959 | Peek, Jr. ................................ | 178/18 |
| 2,975,235 | 3/1961 | Leitner et al. .......................... | 178/18 |
| 3,304,612 | 2/1967 | Proctor et al. ............... | 340/347 AD |
| 3,308,253 | 3/1967 | Krakinowski ........................... | 200/46 |
| 3,440,522 | 4/1969 | Kruse ..................................... | 323/63 |
| 3,885,097 | 5/1975 | Pobgee ................................... | 178/18 |
| 3,925,610 | 12/1975 | French et al. .......................... | 178/18 |
| 3,959,585 | 5/1976 | Mattes et al. .......................... | 178/18 |
| 4,013,835 | 3/1977 | Eachus et al. .......................... | 178/18 |
| 4,080,514 | 3/1978 | Pobgee ................................... | 178/18 |

Primary Examiner—Thomas A. Robinson
Attorney, Agent, or Firm—Cushman, Darby & Cushman

[57] ABSTRACT

A graphical input tablet is disclosed in which the lower surface of a sheet is spaced from the upper surface of a fixed member. Each or both surfaces are formed by parallel conductors but where only one surface is formed in this way the other surface is resistive. Currents are passed alternately through the surfaces to provide voltage gradients, and when a stylus is used to indicate a point, alternate co-ordinate signals for the point are obtained.

3 Claims, 4 Drawing Figures

GRAPHICAL INPUT APPARATUS FOR ELECTRICAL EQUIPMENT

The present invention relates to the determination of the co-ordinates of a point indicated, for example, by using a stylus on a surface. The invention is particularly, but not exclusively, useful as an input device for a computer or for telegraphic apparatus, where the input is to be in the form of writing, charts, graphs or drawings.

The invention is related to the apparatus disclosed in U.S. Pat. No. 3,885,097, which relies on a voltage gradient developed in a resistive sheet suspended above a resistive base member. In operation, a stylus used to indicate a point on the sheet, deforms the sheet to make contact locally with the base member and voltages picked off from the sheet and the base member indicate the co-ordinates of the point.

Since the sheet is constantly deformed while in use, often beyond the elastic limit of the sheet material, its useful life is curtailed. Furthermore for accurate operation the resistivity of the sheet should be linear but it is difficult to achieve a linearity which gives the required precision.

According to the present invention there is provided apparatus for obtaining signals representative of the co-ordinates of a point indicated in a working area, including a sheet having a first surface and a fixed member having a second surface facing the first surface, one of the surfaces being partially formed by a plurality of parallel conductors spaced apart from one another, the other surface being a substantially homogeneous resistive surface or being formed by parallel conductors at right angles to those in the said one surface, the sheet being held in tension across, and adjacent to, the fixed member with the first and second surface out of contact, and the sheet being of such material and/or so mounted that the first and second surfaces are able to make contact temporarily with one another when the sheet is pressed towards the fixed member by means for indicating the position of a point, the apparatus also including resistive means for each surface which has parallel conductors so connected to the conductors that when a current is passed between two terminals of the resistive means a voltage gradient is set up from conductor to conductor of that surface in a direction at right angles to the conductors, changeover means for causing current supplied to the apparatus to flow alternately in two paths, a first path in which the current sets up a voltage gradient in one direction in the first surface, and a second path in which the current sets up a voltage gradient in a direction at right angles to the said one direction in the second surface, and means for deriving first and second signals when the sheet is pressed at a relatively small area towards the fixed member so that the first and second surfaces make contact, the first signal being dependent on the voltage of the first surface when current flows in the second surface and the second signal being dependent on the voltage of the second surface when the current flows in the first surface, and the first and second signals being representative of first and second co-ordinates of the said small area, respectively.

Preferably the first surface is partially formed by the parallel conductors. The sheet is not then required to be of linear resistivity and can be wholly insulating so that a wider choice of sheet materials is available. The conductors may be formed on the sheet by one of the known conducting film deposition techniques and may have a low resistance, characteristic of a metal such as copper. A further advantage is that the quality of the conductors may be checked easily by testing their continuity with a simple continuity tester.

The limited life of the sheet may be extended by providing a carbon fibre reinforced layer either bonded to, or overlaying the sheet.

Although the fixed member can much more easily be made with a homogeneous resistive surface, its surface also may be formed by the parallel conductors laid down on an insulating plate member by conventional deposition techniques.

The operation of apparatus according to the invention is as described in the above-mentioned U.S. Pat. No. 3,885,097 except since at least one resistive surface is replaced by parallel conductors connected to one another through the resistive means for that surface, the voltage gradient which would otherwise be developed in the resistive surface when current flows therethrough is, instead, developed in the resistive means and the conductors take up voltages corresponding to their position in relation to the resistive means.

The resistive means for each surface preferably comprises two elongated resistive members positioned at opposite edges of the surface at right angles to the conductors thereof and in contact therewith.

Figure 2:
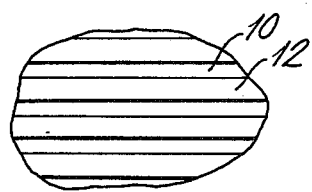
Figure 3:
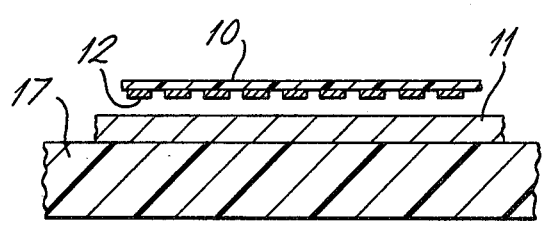
Figure 4:
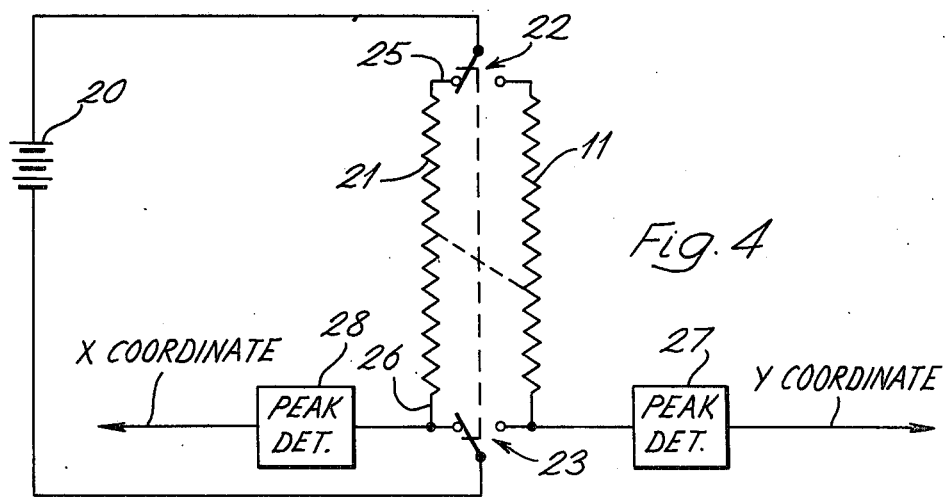

Certain embodiments of the invention will now be described, by way of example, with reference to the accompanying drawings, in which:

FIG. 1 is a schematic drawing of a graphical input tablet according to the invention, FIG. 2 shows an enlarged fragment of the flexible sheet of FIG. 1 viewed from the underside and showing conductive strips thereon, FIG. 3 is an enlarged cross-section of a fragment of the apparatus of FIG. 1 taken at right angles to the conductive strips with the vertical scale exaggerated, and FIG. 4 is a schematic circuit diagram of one arrangement for obtaining co-ordinates from the apparatus of FIG. 1.

In FIG. 1 a flexible sheet 10 of insulating material is mounted over but spaced from a homogeneous resistive fixed member 11. The sheet 10 has a plurality of conducting strips of the undersurface one of which is designated 12. The strips may, for example, be deposited on the sheet material by screen printing or by photographic methods. The sheet is fixed in tension over two elongated spacing members 13 and 14 by two insulating blocks 15 and 16 screwed to a base 17. The members 13 and 14, which are at right angles to the conducting strips, each have an upper resistive layer 13a and 14a, respectively, which make contact with the conducting strips.

A view of the underside of a fragment of the sheet is given in FIG. 2. A portion of the conducting strip 12 is shown together with portions of similar strips which are spaced from each other. Part of the graphical input tablet of FIG. 1 is shown in cross-section in FIG. 3, the cross-section being taken at right angles to the conducting strips. The sheet 10 can be seen again with its conducting strips, and the fixed member 11 which is of solid homogeneous resistive material is also shown spaced from the sheet and mounted on the base 17.

In operation, current from a battery 20 is passed alternately through a resistive path 21 and the resistive member 11 by means of switches 22 and 23 which are together continuously automatically switched by a drive (not shown) between the two contact states shown. The resistive path 21 is constituted by the resistive layers 13a and 14a together with the strips on the underside of the sheet 10. Current reaches the layers 13a and 14a by way of connections 25 and 26 and a voltage gradient is set up in these layers so that when the current flows a voltage gradient is set up and each of the strips takes up a voltage dependent on its position. Connections for the resistive member 11 are not shown in FIG. 1, but they are made by way of two low conductivity members 18 and 19 positioned along, and in contact with, the left and right edges of the member 11 as seen in FIG. 1. Thus current flows through the resistive member 11 in a direction parallel to the strips on the sheet 10.

When a graphical input such as a word or diagram is to be entered into a machine coupled to the graphical input tablet of FIG. 1, a stylus (not shown) which is usually an ordinary pen or pencil is used for example to write the word or draw the diagram on the sheet 10 or on an overlay, such as a sheet of paper, for the sheet 10. The x and y co-ordinates parallel to, and at right angles to the strips, respectively, of a large number of points in lines traced out by the stylus are obtained and transmitted to the machine.

As the stylus is used it indicates the position of each of a number of points on the sheet 10 deforming it so that the strips contact the resistive member. As each point is indicated at least one of the strips makes contact with the slab but with the contacts of the switches 22 and 23 as shown no current flows through the resistive member 11. It can therefore be used as a voltage pick-up and a voltage corresponding to the y co-ordinate of the point indicated by the stylus is passed to a peak detector circuit 27 having a high input impedance. While the stylus indicates substantially the same position the contact states of the switches 22 and 23 change to their other condition and current flows through the resistive member 11 where a voltage gradient is set up in the x direction. Any strip which is now in contact with the resistive member picks off a voltage corresponding to the x co-ordinate, there being no current flowing in the layers 13a and 14a. A peak detector 28 also having a high input impedance is coupled to the connection 26. Thus as the switch contacts cycle from position to position the peak detector circuits provide output signals representative of the x and y co-ordinates of the point indicated by the stylus.

Instead of using the resistive slab 11 an insulating plate member (not shown) with spaced apart parallel conducting strips on the surface which faces the sheet 10 may be used. The conducting strips on the plate member are then at right angles to those on the sheet 10 and elongated resistive members are provided at or adjacent to the edges of the plate member to contact the conducting strips. These resistive members are so connected to the battery 20 by the switches 22 and 23, that current flows in parallel through the resistive members setting up a voltage gradient which is reproduced by the strips.

The switches 22 and 23 are usually transistor circuits, for example as described in FIG. 4 of the above-mentioned U.S. Pat. No. 3,885,097. In fact, a description of the circuits associated with the graphical input tablet of the present FIG. 1 and their operation is described in more detail in U.S. Pat. No. 3,885,097 which also describes alternative circuits which may be used to obtain co-ordinate signals from the tablet.

I claim:

1. Apparatus for obtaining signals representative of the co-ordinates of a point indicated in a working area, including a sheet having a first surface and a fixed member having a second surface facing the first surface, one of the surfaces being partially formed by a plurality of parallel conductors spaced apart from one another, the other surface being a substantially homogeneous resistive surface or being formed by parallel conductors at right angles to those in the said one surface, the sheet being held in tension across, and adjacent to, the fixed member with the first and second surface out of contact, and the sheet being of such material and/or so mounted that the first and second surfaces are able to make contact temporarily with one another when the sheet is pressed towards the fixed member by means for indicating the position of a point, the apparatus also including resistive means for each surface which has parallel conductors so connected to the conductors that when a current is passed between two terminals of the resistive means a voltage gradient is set up from conductor to conductor of that surface in a direction at right angles to the conductors, changeover means for causing current supplied to the apparatus to flow alternately in two paths, a first path in which the current sets up a voltage gradient in one direction in the first surface, and a second path in which the current sets up a voltage gradient in a direction at right angles to the said one direction in the second surface, and means for deriving first and second signals when the sheet is pressed at a relatively small area towards the fixed member so that the first and second surfaces make contact, the first signal being dependent on the voltage of the first surface when current flows in the second surface and the second signal being dependent on the voltage of the second surface when the current flows in the first surface, and the first and second signals being representative of first and second co-ordinates of the said small area, respectively.

2. Apparatus according to claim 1 wherein only one surface is partially formed by parallel conductors and it is the first surface which is so formed.

3. Apparatus according to claim 1 wherein the said resistive means for each surface which has parallel conductors comprises two elongated resistive members positioned at opposite edges of the surface at right angles to the conductors thereof and in contact therewith.

* * * * *